No. 633,980. Patented Oct. 3, 1899.
J. L. ATWATER.
MULTIPLYING ATTACHMENT FOR CAMERAS.
(Application filed Aug. 1, 1898.)

(No Model.)

Witnesses:
W. S. Weston
N. W. Munday

Inventor:
John L. Atwater
By Munday, Evarts & Adcock
his Atty's.

UNITED STATES PATENT OFFICE.

JOHN L. ATWATER, OF WESTERN SPRINGS, ILLINOIS, ASSIGNOR TO THE VIVE CAMERA COMPANY, OF CHICAGO, ILLINOIS.

MULTIPLYING ATTACHMENT FOR CAMERAS.

SPECIFICATION forming part of Letters Patent No. 633,980, dated October 3, 1899.

Application filed August 1, 1898. Serial No. 687,389. (No model.)

*To all whom it may concern:*

Be it known that I, JOHN L. ATWATER, a citizen of the United States, residing in Western Springs, in the county of Cook and State of Illinois, have invented a new and useful Improvement in Multiple-Exposure Cameras, of which the following is a specification.

The object of the present invention is a photograph-camera so constructed that upon the same sensitive plate or film different parts of the sensitized surface may be exposed successively to the field of view—for example, so that several portaits of a person or persons may be taken in different attitudes upon the same negative and with a common background for all; and the invention consists in applying to the camera in front of the lens, and preferably in front of the shutter, a revoluble device, which I have termed a "multiple exposer," constructed to admit the light to a portion only of the lens and to be revolved or adjusted to admit light subsequently to other portions of said lens in any two or more opposite quarters.

The nature of my invention will be better understood from the subjoined specification and the accompanying drawings, which form a part of the same, and in which—

Figure 1:
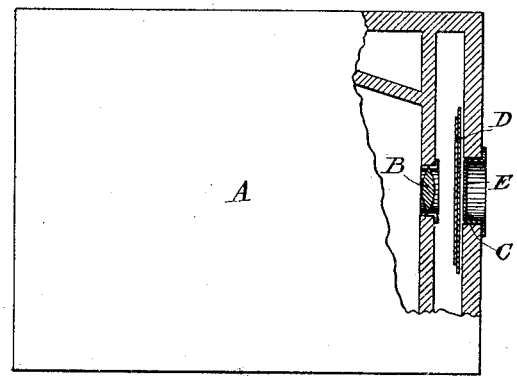
Figure 2:
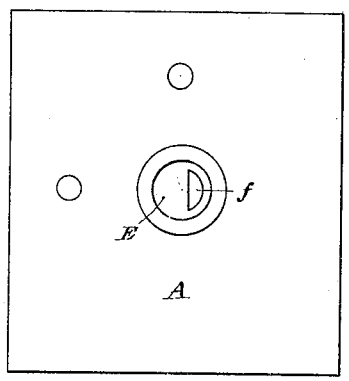
Figure 3:
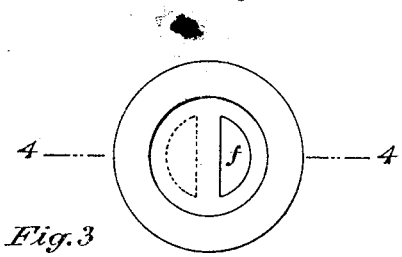
Figure 5:
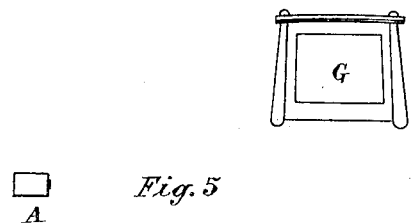
Figure 4:
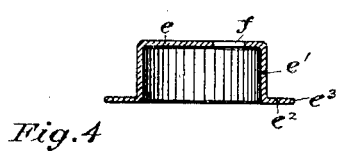

Figure 1 is a side elevation of a common universal focus-box camera provided with my invention and shown partly in section. Fig. 2 is a front elevation of the same. Fig. 3 is a front view, upon a larger scale, of the multiple exposer. Fig. 4 is a section on line 4 4 of Fig. 3, and Fig 5 is a diagram illustrating the method of use of the invention.

Like letters of reference made use of in the several figures indicate like parts.

In the said drawings, A is an ordinary camera-box—such, for example, as the well-known "Vive" camera. B is the lens, C the opening in the box-front coincident in position with the lens, and D is the ordinary shutter placed on the inside of the box-front and between said opening and the lens. All of these parts are or may be of the ordinary construction and do not require special description.

E is the multiple exposer, which in the example illustrated consists of the disk $e$, having the cylindric flange $e'$ and the flat rim $e^2$, said rim having a milled edge $e^3$. In the disk $e$ and at one side of the center is cut the light-aperture $f$, designed to admit light to the lens from a portion only of the field of view. The cylindric portion $e'$ of the exposer is of a size such as to fit snugly in the aperture C in the camera-front, so that it shall be frictionally held and the juncture between it and said box-front be light-tight, but still loose enough so that the exposer may be turned readily with the fingers. Such an exposer may be readily applied to any of the ordinary universal focus-box or hand cameras, and the device may be made very cheaply by being stamped up of proper size and shape out of thin metal and the light-aperture simultaneously cut.

To illustrate one of the uses of my improvement, I refer to the diagram Fig. 5, in which A is supposed to be the camera-box, and G and G' are two chairs placed a little distance apart and facing each other. Suppose it is desired to take two portraits of the same person upon a single negative or plate. Let the person be seated first in the chair G, then turn the exposer so that the aperture $f$ will be on the same side as the sitter, (the shutter during this adjustment being of course closed,) then open the shutter, and give an exposure, which should be proportionately longer than where the open lens is used—say about three times as long—on account of the amount of light which is cut off. In the example exposer shown in the drawings the exposure ought to be about three times as long as when the open lens is used. After this exposure close the shutter, and while the shutter is closed let the person being photographed change his seat to the chair G'. Then turn the exposer half around, so that the aperture $f$ will assume the position indicated in dotted lines in Fig. 3, and repeat the exposure for this position. When the plate so exposed has been developed, the two portraits of the same individual will be found facing each other upon the same plate, while the background or landscape will appear common to both figures and as though taken with a single exposure.

I have produced by this instrument some very amusing and puzzling results—as, for instance, the picture of a man wheeling himself in a wheelbarrow, or, for example again, the picture of a lady talking to her double—and the apparatus affords thus an almost endless variety of amusing results, as well as giving several views of the same face upon the same plate without the use of a mirror. Care should be taken in operating the device not to get the two opposite subjects too near the center of the plate, lest they come into the center lap of the two exposures; but as the finder on the ordinary camera usually shows slightly less than will appear on the plate a sufficient guide will be to have the opposite changed positions of the subject such that they will be at the extreme edges of the ground glass of the finder. As the exposer is made revoluble, the amateur photographer may vary the operation by exposing the subject in two positions in a vertical instead of a horizontal line or, if preferred, making the two exposures in a diagonal—as, for instance, two pictures of the same person seated on different rungs of a diagonal ladder. Although the background and surroundings in the use of this instrument are thus taken by two exposures which slightly overlap each other, it is not ordinarily possible in the completed photograph to detect this fact.

Another use to which the device may be put is in some kinds of landscape photography where it is desired to give an unequal exposure to different parts of the view. Thus it may happen that the foreground of the landscape to be photographed is poorly lighted, while the background and sky are brilliantly lighted. By the use of my apparatus the brilliantly-lighted portion may be given a short exposure and the poorly-lighted portion a much longer one, with the result of a negative which shall be practically uniformly dense throughout. Other uses will suggest themselves to the practical mind of the experienced photographer.

I am aware that cameras have been provided with devices for cutting off the light from a portion of the lens and then and subsequently from another portion of the lens, so that two exposures may be given upon the plate for the production of a somewhat similar result to that which I have in view, and I do not claim such idea broadly to be my invention, as my invention is an improvement upon this, consisting in the greater simplicity of construction and application of the device to the camera, and, further, in the fact that my device being made revoluble the exposures may be made upon different parts of the plate not only horizontally separated from each other, but vertically or diagonally or at any angle whatever.

I claim—

1. The combination of the camera-box A, the lens B, the shutter D, and the revoluble multiple exposer E fitted in the aperture C in such manner that it may be turned, and having the exposure-opening $f$, substantially as specified.

2. As an article of manufacture the revoluble multiple exposer adapted to fit into the light-opening of the camera and to be turned therein, and having the light-opening $f$ at one side of the center, substantially as specified.

3. The multiple exposer comprising the disk $e$, the cylindric sides $e'$, and flange $e^2$, the disk $e$ having the light-opening $f$, substantially as specified.

JOHN L. ATWATER.

Witnesses:
 H. M. MUNDAY,
 JOHN W. MUNDAY.